# 3,137,713
FLUORINE-CONTAINING α-SULFOCARBOXYLIC ESTERS

Kwan-ting Shen and Patrick M. Quinlan, St. Louis, Mo., assignors to Petrolite Corporation, Wilmington, Del., a corporation of Delaware
No Drawing. Filed May 3, 1962, Ser. No. 192,086
4 Claims. (Cl. 260—400)

This invention relates to fluorine-containing esters of α-sulfocarboxylic acids. The invention relates to esters of the formula

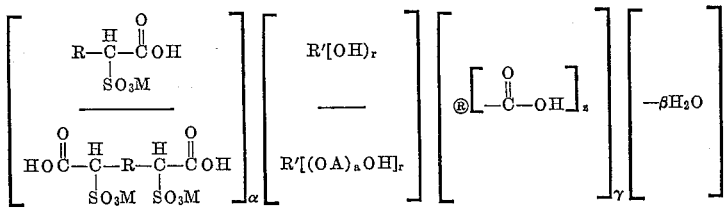

where R is a hydrocarbon radical, for example alkyl, alkylene, such as (1) an alkyl group having at least 6 carbon atoms, such as 6–50 or more, advantageously at least 10 carbons, but preferably 14–16 carbons or (2) an alkylene radical having at least 1 carbon atom, such as 1–50 or more, advantageously 2–35, but preferably 4–10 carbons; M is hydrogen or a cation; R' and ⓡ are the moieties of the alcohol (or glycol, polyol, etc.) and carboxylic acid respectively and may be hydrocarbon or a fluorine-containing group, such as a fluorocarbon, but preferably an alkyl or an alkylene, or a fluoroalkyl or a fluoralkylene group; r represents the number of OH groups; and z indicates the number of carboxylic acid groups, which may be for example in either case (i.e. for both r and z) 1–3 or more, advantageously 1–2, but preferably 1; α represents the moles of α-sulfo acid such as 0.1–3 or more and γ the moles of carboxylic acid reacted per mole of alcohol, for example 0–3 or more; β represents the moles of water removed during esterification; OA represents an oxyalkylene unit derived from an α,β-alkylene oxide, or an α,γ-alkylene oxide (an oxetane); and a represents the moles of alkylene oxide added for example 1–100, such as 1–50, advantageously 1–20, but preferably 1–10; with the proviso that either R' or ⓡ or both be fluorine-containing.

The compounds of this invention include fluoro-containing esters of the following type:
(1) Esters of the sulfo acid and a fluoro alcohol.
(2) Esters of the sulfo acid, a fluoropolyol, and a fluorocarboxylic acid.
(3) Esters of the sulfo acid, a non-fluoropolyol, and a fluorocarboxylic acid.
(4) Esters of the sulfo acid, a fluoropolyol, and a non-fluorocarboxylic acid.

The following represents non-limiting examples of fluorine-containing alcohols.

Fluorinated alkanols having 1–18 or more carbons for example, fluorine derivatives of the $CH_3(CH_2)_{0-17}OH$ series with at least 1 or more of their hydrogen atoms replaced by fluorine, including the perfluoro derivative (i.e. all hydrogens replaced by fluorine).

Fluorine-containing polyols, such as glycols, can also be employed for example fluorine-containing glycols derived from glycols of the formula $$HO-(CH_2)_{2-10}-OH$$

where one or more of the hydrogens is replaced by fluorine, including perfluoro glycols.

The preparation of fluoro alcohols and polyols is well known. For example, they can be prepared by the following means:

(1) Reacting tetrafluoroethylene with methanol at 50–350° C. in the presence of a peroxy catalyst. For example:

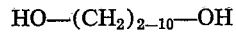

(2) Reduction of the corresponding carboxylic acids, for example $$CF_3(CF_2)_nCOOH \xrightarrow{LiAlH} CF_3(CF_2)_nCH_2OH$$

The fluoro acids can be made by the electrolysis of the hydrocarbon acid or anhydride in HF thus forming the fluorinated acid fluoride which is subsequently hydrolysed to the acid. Preferably the fluoroacids are fluoro-containing alkylene carboxylic acids, for example fluoro-acids derived from the following acids:

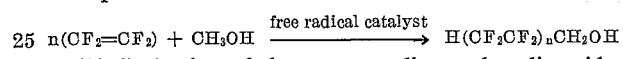

The following compounds illustrate the invention:

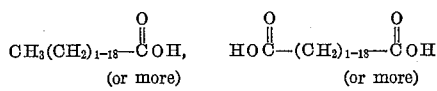

(polymer)

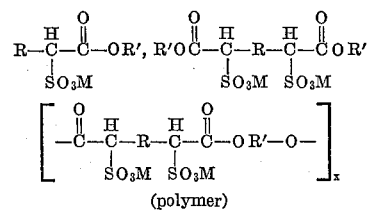

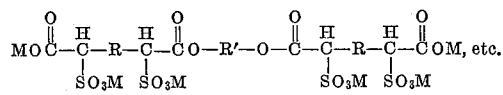

In addition the glycol esters of this invention can be further reacted with a carboxylic acid, including either a fluorocarbon or a hydrocarbon carboxylic acid as well as combinations thereof. The following compounds are exemplary:

$$\textcircled{R}-\overset{O}{\overset{\|}{C}}O-R'-O\overset{O}{\overset{\|}{C}}-\overset{H}{\overset{|}{C}}-R, \quad \left[\textcircled{R}-\overset{O}{\overset{\|}{C}}-OR'-O\overset{O}{\overset{\|}{C}}-\overset{H}{\overset{|}{C}}-\right]_x R$$

$$\textcircled{R}-\overset{O}{\overset{\|}{C}}-O-R'-O-\overset{O}{\overset{\|}{C}}-\overset{H}{\overset{|}{C}}-R-\overset{H}{\overset{|}{C}}-\overset{O}{\overset{\|}{C}}OM$$
$$\qquad\qquad\qquad\qquad\qquad SO_3M \quad SO_3M$$

$$MO-\overset{O}{\overset{\|}{C}}-\textcircled{R}-\overset{O}{\overset{\|}{C}}-OR'O-\overset{O}{\overset{\|}{C}}-\overset{H}{\overset{|}{C}}-R$$
$$\qquad\qquad\qquad\qquad\qquad SO_3M$$

$$\left[MO\overset{O}{\overset{\|}{C}}-\textcircled{R}-\overset{O}{\overset{\|}{C}}O-R'O-\overset{O}{\overset{\|}{C}}-\overset{H}{\overset{|}{C}}-\right]_x R, \text{ etc.}$$
$$\qquad\qquad\qquad\qquad\qquad SO_3M$$

In addition, the fluoro alcohol, glycol or polyol can be oxyalkylated $R'[OH]_r + \text{alkylene oxide} \rightarrow R'[(OA)_aOH]_r$ and esterified to yield esters corresponding to the above.

For example, $$R-\overset{H}{\overset{|}{C}}-\overset{O}{\overset{\|}{C}}-OR'$$
$$\quad SO_3M$$

would be $$R-\overset{H}{\overset{|}{C}}-\overset{O}{\overset{\|}{C}}-(AO)_aOR'$$
$$\quad SO_3M$$

and $$R'O\overset{O}{\overset{\|}{C}}-\overset{H}{\overset{|}{C}}-R-\overset{H}{\overset{|}{C}}-\overset{O}{\overset{\|}{C}}-OR'$$
$$\quad\quad SO_3M \quad SO_3M$$

would be $$R'-(OA)_aO\overset{O}{\overset{\|}{C}}-\overset{H}{\overset{|}{C}}-R-\overset{H}{\overset{|}{C}}-\overset{O}{\overset{\|}{C}}(OA)_aOR'$$
$$\quad\quad\quad SO_3M \quad SO_3M$$

The alcohols, glycols and polyols of this invention can also be oxyalkylated to yield $(OA)_a$ units.

$(OA)_a$ is derived from any suitable $\alpha,\beta$-alkylene oxide, for example, alkylene oxides of the formula $$R^1-\overset{R^1}{\underset{|}{C}}\overset{R^3}{\underset{\diagdown O \diagup}{\underset{|}{C}}}-R^4$$

where $R^1$, $R^2$, $R^3$, $R^4$ are hydrogen or a substituted group, such as alkyl, cycloalkyl, aryl, etc., for example ethylene oxide, propylene oxide, butylene oxide, amylene oxide, octylene oxide, styrene oxide, methylstyrene oxide, cyclohexene oxide (where $R^1$ and $R^3$ are joined to form a ring), etc.

Equivalents of alkylene oxides can also be employed, for example alkylene carbonates, i.e. ethylene carbonate, propylene carbonate, butylene carbonate, etc. In addition alkylene oxides of the glycide, methyl glycide, etc. type and their equivalents can also be employed.

$(OA)_a$ denotes (1) homo units for example $-(OEt)_n$, $-(OPr)_n-$, $-(OBu)_n-$, $-(O\,Octyl)_n-$, $$-(O-CHCH_2)_n-$$
$$\qquad\qquad |$$
$$\qquad\qquad C_6H_5$$

etc., (2) block units, $$-(OEt)_n(OPr)_m-, \quad -(OEt)_n(OBu)_m-,$$

$$(OPr)_n(OEt)_m(OPr)_x, \quad (OEt)_n(OPr)_m(OBu)_x$$

$$(OEt)_n(OCH-CH_2)_m$$
$$\qquad\qquad\quad |$$
$$\qquad\qquad\quad C_6H_5$$

etc., where $n+m+x=a$; (3) hetero units containing groups which are random mixtures of more than one oxide $(OEt\text{-}OPr)_n$, $(OPr\text{-}OBu)_n$, $(OEt\text{-}OBu)_n$, wherein the ratio of each oxide to the other is for example 1–99 to 99–1; (4) hetero-homo units for example $$(EtO)_n(EtO\text{-}PrO)_m, \quad (EtO)_n(PrO)_m(EtO\text{-}PrO)_x,$$

$$(EtO\text{-}PrO)_n(BuO)_m, \text{ etc.}$$

In addition, $(OA)_a$ can be derived from oxetanes (e.g. $\alpha$-$\gamma$-alkylene oxides), for example those of the formula $$\begin{array}{c} D \\ | \\ C \\ \diagup \;\;\; \diagdown \\ CH_2 \;\; F \;\; CH_2 \\ \diagdown \;\;\;\; \diagup \\ O \end{array}$$

where D and F are hydrogen or a substituted radical for example alkyl, aryl, cycloalkyl, alkenyl, aralkyl, etc.

In addition, D and F can be substituted such as where the oxetane is derived from pentaerythritol and derivatives thereof. Examples of such oxetanes can be found in the American Chemical Society Monogram "The Pentaerythritols" by Berlow et al. (Reinhold, 1958), Chapter X. Preferred embodiments of such pentaerythritol derived oxetanes include those of the formula $$\begin{array}{c} CH_2X' \\ | \\ C \\ \diagup | \diagdown \\ CH_2 \;\; CH_2Y' \;\; CH_2 \\ \diagdown \;\;\;\;\; \diagup \\ O \end{array}$$

where X' and Y' are halogen, cyano, hydroxy, alkoxy, etc.

The R moiety which completes the carbon chain of the carboxylic acid from which the $\alpha$-sulfo carboxylic acid is derived has the meaning described above. These acids may be of animal, vegetable or mineral origin.

The sulfacid may be a polycarboxylic acid, for example of the formula $$HO\overset{O}{\overset{\|}{C}}-\overset{H}{\overset{|}{C}}-R\overset{}{-}\left[\overset{H}{\overset{|}{C}}-\overset{O}{\overset{\|}{C}}OH\right]_m$$
$$\quad\quad SO_3M \quad\quad SO_3M$$

where $m$ is an integer for example, 1–2, but preferably 1, when the formula is $$HO\overset{O}{\overset{\|}{C}}-\overset{H}{\overset{|}{C}}-R-\overset{H}{\overset{|}{C}}-\overset{O}{\overset{\|}{C}}OH$$
$$\quad\quad SO_3M \quad\quad SO_3M$$

Esters of these acids and alcohols, or polyols, may be illustrated by the following formula $$\left[HO\overset{O}{\overset{\|}{C}}-\overset{H}{\overset{|}{C}}-R-\overset{H}{\overset{|}{C}}-\overset{O}{\overset{\|}{C}}OH\right]_\alpha \left[HO(AO)_a-R'\right]_x \left[\textcircled{R}-\overset{O}{\overset{\|}{C}}OH\right]_\gamma \left[-\beta H_2O\right]$$
$$\qquad\quad SO_3M \quad\quad SO_3M$$

Typical examples of carboxylic acids capable of being converted to α-sulfo acids include those derived from alkane carboxylic acids,

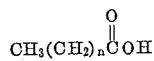

and alkylene dicarboxylic acids,

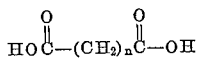

Since the alcohols or polyols of this invention may be block polymers containing blocks or segments of alkylene oxide units which are added sequentially, the reaction is in essence a stepwise procedure. For the sake of simplicity of presentation, the invention will be illustrated by employing as a base oxyalkylatable compound $R'(OH)_x$ and by employing only ethylene, propylene, and butylene oxides with the understanding that other hydrophobe oxides can be used in place of propylene and butylene oxides such as amylene oxide, octylene oxide, styrene oxide, etc. These are shown in the following table.

TABLE I

Step I (1)  $R'[(EtO)_nOH]_x$
(2)  $R'[(PrO)_nOH]_x$
(3)  $R'[(BuO)_nOH]_x$
(4)  $R'[(MO)_nOH]_x$
(5)  $R'[(PrO\text{-}BuO)_nOH]_x$

Step II

Reaction of the Step I product with one of the five oxides or mixtures employed in Step I, which oxide had not been reacted in the immediately preceding step. For example:

(6)  $R'[(EtO)_n(PrO)_mOH]_x$
(7)  $R'[(EtO)_n(BuO)_mOH]_x$
(8)  $R'[(EtO)_n(MO)_mOH]_x$
(9)  $R'[(EtO)_n(PrO\text{-}BuO)_mOH]_x$
(10) $R'[(PrO)_n(EtO)_mOH]_x$
(11) $R'[(PrO)_n(BuO)_mOH]_x$
(12) $R'[(PrO)_n(MO)_mOH]_x$
(13) $R'[(PrO)_n(PrO\text{-}BuO)_mOH]_x$
(14) $R'[(BuO)_n(EtO)_mOH]_x$
(15) $R'[(BuO)_n(PrO)_mOH]_x$
(16) $R'[(BuO)_n(MO)_mOH]_x$
(17) $R'[(BuO)_n(PrO\text{-}BuO)_mOH]_x$
(18) $R'[(MO)_n(EtO)_mOH]_x$
(19) $R'[(MO)_n(PrO)_mOH]_x$
(20) $R'[(MO)_n(BuO)_mOH]_x$
(21) $R'[(MO)_n(PrO\text{-}BuO)_mOH]_x$
(22) $R'[(PrO\text{-}BuO)_n(EtO)_mOH]_x$
(23) $R'[(PrO\text{-}BuO)_n(PrO)_mOH]_x$
(24) $R'[(PrO\text{-}BuO)_n(BuO)_mOH]_x$
(25) $R'[(PrO\text{-}BuO)_n(MO)_mOH]_x$

Step III

The products of Step II can be reacted with one of the five epoxides or mixture of oxides which had not been reacted in the immediately preceding step, i.e. either EtO, PrO, BuO, MO, or PrO-BuO, with the above exclusion as to the epoxide just reacted. This will be illustrated as follows:

(26) $R'[(EtO)_n(PrO)_m(EtO)_xOH]_x$
(27) $R'[(EtO)_n(PrO)_m(BuO)_xOH]_x$
(28) $R'[(EtO)_n(PrO)_m(MO)_xOH]_x$
(29) $R'[(EtO)_n(PrO)_m(Pro\text{-}BuO)_xOH]_x$
(30) $R'[(EtO)_n(BuO)_m(EtO)_xOH]_x$
(31) $R'[(EtO)_n(BuO)_m(PrO)_xOH]_x$
(32) $R'[(EtO)_n(BuO)_m(MO)_xOH]_x$
(33) $R'[(EtO)_n(BuO)_m(PrO\text{-}BuO)_xOH]_x$
(34) $R'[(EtO)_n(MO)_m(EtO)_xOH]_x$
(35) $R'[(EtO)_n(MO)_m(PrO)_xOH]_x$
(36) $R'[(EtO)_n(MO)_m(BuO)_xOH]_x$
(37) $R'[(EtO)_n(MO)_m(PrO\text{-}BuO)_xOH]_x$
(38) $R'[(EtO)_n(PrO\text{-}BuO)_m(EtO)_xOH]_x$
(39) $R'[(EtO)_n(PrO\text{-}BuO)_m(PrO)_xOH]_x$
(40) $R'[(EtO)_n(PrO\text{-}BuO)_m(BuO)_xOH]_x$
(41) $R'[(EtO)_n(PrO\text{-}BuO)_m(MO)_xOH]_x$
(42) $R'[(PrO)_n(EtO)_m(PrO)_xOH]_x$
(43) $R'[(PrO)_n(EtO)_m(BuO)_xOH]_x$
(44) $R'[(PrO)_n(EtO)_m(MO)_xOH]_x$
(45) $R'[(PrO)_n(EtO)_m(PrO\text{-}BuO)_xOH]_x$
(46) $R'[(PrO)_n(BuO)_m(EtO)_xOH]_x$
(47) $R'[(PrO)_n(BuO)_m(PrO)_xOH]_x$
(48) $R'[(PrO)_n(BuO)_m(MO)_xOH]_x$
(49) $R'[(PrO)_n(BuO)_m(PrO\text{-}BuO)_xOH]_x$
(50) $R'[(PrO)_n(MO)_m(EtO)_xOH]_x$
(51) $R'[(PrO)_n(MO)_m(PrO)_xOH]_x$
(52) $R'[(PrO)_n(MO)_m(BuO)_xOH]_x$
(53) $R'[(PrO)_n(MO)_m(PrO\text{-}BuO)_xOH]_x$
(54) $R'[(PrO)_n(PrO\text{-}BuO)_m(EtO)_xOH]_x$
(55) $R'[(PrO)_n(PrO\text{-}BuO)_m(PrO)_xOH]_x$
(56) $R'[(PrO)_n(PrO\text{-}BuO)_m(BuO)_xOH]_x$
(57) $R'[(PrO)_n(PrO\text{-}BuO)_m(MO)_xOH]_x$
(58) $R'[(BuO)_n(EtO)_m(PrO)_xOH]_x$
(59) $R'[(BuO)_n(EtO)_m(BuO)_xOH]_x$
(60) $R'[(BuO)_n(EtO)_m(MO)_xOH]_x$
(61) $R'[(BuO)_n(EtO)_m(PrO\text{-}BuO)_xOH]_x$
(62) $R'[(BuO)_n(PrO)_m(EtO)_xOH]_x$
(63) $R'[(BuO)_n(PrO)_m(BuO)_xOH]_x$
(64) $R'[(BuO)_n(PrO)_m(MO)_xOH]_x$
(65) $R'[(BuO)_n(PrO)_m(PrO\text{-}BuO)_xOH]_x$
(66) $R'[(BuO)_n(MO)_m(EtO)_xOH]_x$
etc.

Step IV involves the oxyalkylation of the products of Step III. Step V involves the oxyalkylation of Step IV. Further oxyalkylations involve Steps VI–X or higher. This process can be continued ad infinitum.

Although the hydroxy compounds described above are oxygen-containing compounds, corresponding compounds can be formed from corresponding sulfur-containing compounds. In addition, sulfur analogues of the alkylene oxides can also be employed. Thus, a thioalcohol or a thioglycol can be oxyalkylated with alkylene oxide, alkylene sulfide, or mixtures of alkylene oxides and alkylene sulfide in a random or block-wise fashion. The following compounds are exemplary:

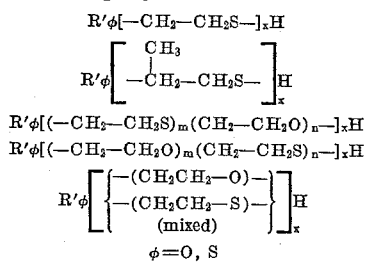

$$R'\phi[-CH_2-CH_2S-]_xH$$

$$R'\phi\left[\begin{array}{c}CH_3\\|\\-CH_2-CH_2S-\end{array}\right]_xH$$

$$R'\phi[(-CH_2-CH_2S)_m(CH_2-CH_2O)_n-]_xH$$

$$R'\phi[(-CH_2-CH_2O)_m(CH_2-CH_2S)_n-]_xH$$

$$R'\phi\left[\left\{\begin{array}{c}-(CH_2CH_2-O)-\\-(CH_2CH_2-S)-\\(mixed)\end{array}\right\}\right]_xH$$

$$\phi=O, S$$

M designates H or a cation. The salts of the sulphocarboxylic acid esters which may be produced by this invention are many and varied. In general, salts of most inorganic and organic bases may be prepared. Among the inorganic salts are the alkali metal and alkaline earth salts, such as the sodium, potassium, calcium and magnesium, etc. salts as well as the salts of heavy metals. Ammonium and substituted ammonium or organic nitrogenous base salts may also be prepared. Included within this class are, for example, the salts of alcohol amines including monoethanolamine, diethanolamine, triethanolamine, propanolamines, butanolamines, pentanolamines, glycerolamines, dimethyl monoethanolamine, diethyl monoethanolamine, dibutyl monoethanolamine, diethanol ethyl amine, cyclohexyl ethanolamine, alkylol polyamines such as alkylol derivatives of ethylene diamine, monomethyl mono-ethanolamine, diethyl monoethanolamine, 1-amino-2, 3-propanediol, 1,2-diaminopropanol; alkylamines such as butylamine, diethylamine, ethylene diamine, diethylene triamine, triethylene tetramine, monomethyl ethylene diamine, monoethyl diethylene tetramine, hydrazine and substituted hydrazines, aromatic and heterocyclic bases and cyclic nitrogenous substances such as pyridine, quinaldine, piperidine, methylpyridine, and homologues and derivatives thereof, and, in general, primary, secondary and tertiary amines substituted or not with other radicals such as hydroxy, alkyl, aryl, cycloalkyl groups and the like; quaternary ammonium bases or hydroxides such as tetramethyl ammonium hydroxide, tetraethyl ammonium hydroxide, quaternary ammonium bases with dissimilar alkyl radicals such as methyltriethyl ammonium hydroxide, propyltrimethyl ammonium hydroxide, mixtures of any two or more thereof, and the like. It will be understood that these organic nitrogenous bases may be employed in pure, impure or commercial form such as, for example, commercial triethanolamine which contains minor proportions of mono- and diethanolamine. The tabulation of specific salts given hereinabove is by no means meant to be exhaustive, but it affords to those skilled in the art more than an adequate exemplification of the practice of this invention.

In certain fields of utility other salts can also be employed. For example, calcium, barium, zinc, strontium, aluminum, chromium, nickel and other polyvalent metal salts which are soluble in hydrocarbons may be used as oil soluble detergents. They are useful, for example, in turbine oils and in lube oils of the type used in the crankcases of internal combustion engines. For this purpose they are ordinarily added to the oils in amounts of about 0.1% to about 5% by weight.

In addition to their utility as wetting agents and detergents certain salts may be employed for special purposes. For example, copper, cadmium and mercury salts may be applied as mildew-proofing agents, for example in cellulosic textiles. Amine and quaternary ammonium salts may be applied as moth proofing agents for woolens.

Although various meanings have been assigned above, the best combinations thereof will depend on the particular application to which the composition is applied. For example, R and R' can be selected so as to yield the desired oil or water solubility, or the type and amount and proportions of $(OA)_a$ can vary the solubility which has already been imparted by R and R'. In certain systems it may be desirable to employ the composition as a free sulfonic acid while in others it may be desirable to employ it in the form of its salt. Therefore, specific composition variations will depend on the particular system in which it is employed.

The compositions of this invention containing free hydroxyl groups can also be acylated with a carboxylic acid.

Suitable acids include straight chain and branched chain, saturated and unsaturated, aliphatic, alicyclic, fatty, aromatic, hydroaromatic, and aralkyl acids, etc.

Examples of saturated aliphatic monocarboxylic acids are acetic, propionic, butyric, valeric, caproic, heptanoic, caprylic, nonanoic, capric, undecanoic, lauric, tridecanoic, myristic, pentadecanoic, palmitic, heptadecanoic, stearic, nonadecanoic, eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids are acrylic, methacrylic, crotonic, anglic, teglic, and pentenoic acids, the hexenoic acids, for example, hydrosorbic acid, the heptenoic acids, the octenoic acids, the nonenoic acids, the decenoic acids, for example, obtusilic acid, the undecenoic acids, the dodencenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example, the eicosenoic acids, the decosenoic acids, for example, erucic acid, brassidic acid, cetoleic acid, the tetradosenic acids, and the like.

Examples of dienoic acids are the pentadienoic acids, the hexadienoic acids, for example, sorbic acid, the octadienoic acids, for example, linoleic, and the like.

Examples of the trienoic acids are the octadecatrienoic acids, for example, linolenic acid, eleostearic acid, pseudo-eleostearic acid, and the like.

Carboxylic acids containing functional groups such as hydroxy groups can be employed. Hydroxy acids, particularly the alpha hydroxy acids include glycolic acid, lactic acid, the hydroxyvaleric acids, the hydroxy caproic acids, the hydroxyheptanoic, acids, the hydroxy caprylic acids, the hydroxynonanoic acids, the hydroxycapric acids, the hydroxydecanoic acids, the hydroxy lauric acids, the hydroxy tridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelardic acid, hydroxyoctadecynoic acids, for example, ricinstearolic acid, the hydroxyelcosanoic acids, for example hydroxyarachidic acid, the hydroxydocosanoic acids, for example, hydroxybehenic acid, and the like.

Examples of acetylated hydroxyacids are ricinoleyl lactic acid, acetyl ricinoleic acid, chloroacetyl ricinoleic acid, and the like.

Examples of the cyclic aliphatic carboxylic acids are those found in petroleum called naphthenic acids, hydrocarbic and chaumoogric acids, cyclopentane carboxylic acids, cyclohexanecarboxylic acid, campholic acid, fenchlolic acids, and the like.

Examples of aromatic monocarboxylic acids are benzoic acid, substituted benzoic acids, for example, the toluic acids, the xyleneic acids, alkoxy benzoic acid, phenyl benzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed.

Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; Twitchell fatty acids, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids are those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids and the like.

Examples of unsaturated aliphatic polycarboxylic acids are fumaric, maleic, mesocenic, citraconic, glutonic, itaconic, muconic, aconitic acids, and the like.

Examples of aromatic polycarboxylic acids are phthalic, isophthalic acids, terephthalic acids, substituted derivatives thereof (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups are hemimellitic, trimellitic, trimesic, mellophanic, prehnitic, pyromellitic acids, mellitic acid, and the like.

Other polycarboxylic acids are the dimeric, trimeric and polymeric acids, for example, dilinoleic, trilinoleic, and other polyacids sold by Emery Industries, and the like. Other polycarboxylic acids include those containing ether groups, for example, diglycolic acid. Mixtures of the above acids can be advantageously employed.

In addition, acid precursors such as esters, glycerides, etc. can be employed in place of the free acid.

The following examples are presented by way of illustration and not of limitation.

EXAMPLE 1

Into a 500 ml. resin pot fitted with a stirrer, Dean-Stark water trap, and reflux condenser was introduced a mixture containing 181.5 g. (0.5 mole) of α-sulfostearic acid, 66 g. (0.5 mol) of 1H,1H,3H-tetrafluoro-1-propanol, and 150 ml. of benzene. The mixture was stirred and heated at reflux temperature until the theoretical amount of water of esterification was removed (about 9 ml.). After the reaction was completed, as checked by infrared spectra, the benzene was removed by heating the mixture in vacuo. The product is

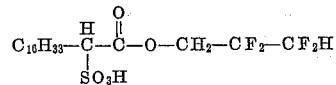

EXAMPLE 2

Into a 500 ml. resin pot fitted with a stirrer, Dean-Stark water trap, and reflux condenser was introduced a mixture containing 170 g. (0.5 mol) of α-sulfopalmitic acid, 216.1 g. (0.5 mol) of 1H,1H,9H-hexadecafluoro-1-nonanol, and 150 ml. of benzene. The mixture was stirred and heated at reflux temperature until the theoretical amount of water of esterification was removed (about 9 ml.). After the reaction was completed, as checked by infrared spectra, the benzene was removed by heating the mixture in vacuo. The product is

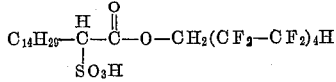

A summary of the above and additional examples are presented in the following table in order to save repetitive details. In addition to the free α-sulfo acid, the salts indicated in the α-sulfo acid column are also prepared, for example in Example 1 (M=Na⊕), the sodium salt as well as the free acid was prepared.

TABLE II

| Ex. | α-Sulfo Acid | M | Alcohol | M | Carboxylic Acid | M | Moles Water Removed |
|---|---|---|---|---|---|---|---|
| 1 | Stearic acid (M=Na⊕) | 0.5 | 1H,1H,3H, tetrafluoro-1-propanol | 0.5 | | | 0.5 |
| 2 | Palmitic acid (M=K⊕) | 0.5 | 1H,1H,9H, hexadecafluoro-1-nonanol | 0.5 | | | 0.5 |
| 3 | Stearic acid (M=Ca++) | 0.5 | 1H,1H,5H-octafluoro-1-pentanol | 0.5 | | | 0.5 |
| 4 | Stearic acid (M=C₁₂H₂₅N(H)—CH₂CH₂CH₂NH₃⊕) | 0.5 | 1H,1H,7H-dodecafluoro-1-heptanol | 0.5 | | | 0.5 |
| 5 | Palmitic acid (M=C₁₂H₂₅N(H)(CH₃)₂⊕) | 0.5 | 1H,1H,11H-eicosafluoro-1-undecanol | 0.5 | | | 0.5 |
| 6 | Palmitic acid (M=NH₂(CH₂CH₂N)₂H₂⊕) | 0.5 | Ethylene glycol | 0.5 | Trifluoro acetic acid | 0.5 | 1 |
| 7 | Palmitic acid (M=H₂N⊕–morpholine) | 0.5 | Polypropylene M.W. glycol 400 | 0.5 | do | 0.5 | 1 |
| 8 | Adipic acid (disulfo) (M=HN⊕–piperazine–NH) | 0.5 | 1H,1H,11H, eicosafluoro-1-undecanol | 1.0 | | | 1 |
| 9 | Stearic acid (M=N–N(C₁₂H₂₅)=C–N–CH₂CH₂NH₃⊕ imidazoline) | 0.25 | Polyethylene glycol MW 1000 | 0.25 | Perfluoro decanoic acid | 0.25 | 1 |

TABLE II—Continued

| Ex. | α-Sulfo Acid | M | Alcohol | M | Carboxylic Acid | M | Moles Water Removed |
|---|---|---|---|---|---|---|---|
| 10 | Stearic acid (M=Na$^\oplus$) | 0.5 | Polybutylene MW glycol 400 | 0.5 | Perfluoropropionic acid | 0.5 | 1 |
| 11 | Palmitic acid (M=K$^\oplus$) | 0.1 | Polypropylene MW glycol 2000 | 0.1 | ____do____ | 0.1 | 0.1 |
| 12 | Lauric acid (M=HN$^\oplus$⟨⟩) | 1 | Hexafluoro pentanediol | 0.5 | | | 1 |
| 13 | Lauric acid (M=N–C(C$_{17}$H$_{33}$)=N$^\oplus$–CH$_2$CH$_2$OH) | 0.5 | ____do____ | 0.5 | Oleic acid | 0.5 | 1 |
| 14 | Lauric acid (M=NH$_2$(CH$_2$CH$_2$N)$_3$$\overset{H}{\overset{\oplus}{N}}$H$_3$) | 1 | ____do____ | 0.5 | | | 1 |
| 15 | Stearic acid (M=(cyclohexyl)$_2$–$\overset{\oplus}{N}$H$_2$) | 1 | 1H,1H,3H-tetrafluoro-1-propanol+EtO (1:10M) | 1 | | | 1 |
| 16 | Stearic acid (M=Co$^{++}$) | 1 | 1H,1H,9H,hexadecafluoro-1-+EtO+PrO (1:5:3M) | 1 | | | 1 |
| 17 | Palmitic acid (M=Na$^\oplus$) | 1 | Hexafluoro pentanediol+EtO (1:20M) | 0.5 | | | 1 |
| 18 | Palmitic acid (M=H$_2$$\overset{\oplus}{N}$=(CH$_2$CH$_2$OH)$_2$) | 0.5 | Hexafluoro pentanediol+EtO (1:25M) | 1 | Perfluoropropionic acid | 0.5 | 1 |

USES

The products obtained by this process are valuable anionic surface active agents and have many varied commercial uses. The most conspicuous property of these products is their great activity at surfaces and interfaces which promotes their use in a large field of the technical arts. For instance, they can be used as wetting, frothing, or washing agents in the treating and processing of textiles; for converting liquid or solid substances which per se are insoluble in water (such as hydrocarbons, higher alcohols, oils, fats, waxes, and resins) into creamy emulsions, clear solutions or fine stable dispersions; for dyeing; for the pasting of dyestuffs; for fulling, sizing, impregnating and bleaching treatments; as cleansing agents in hard water; in tanning and mordanting processes; for dyeig acetate with insoluble dyestuffs; for the preparation of dyestuffs in finely divided form; for dispersible dye powders; for producing foam for fire extinguishers; as a means for improving the absorptive power of fibrous bodies; and as an aid in softening hides and skins.

In addition, these products are valuable emulsifiers for insecticidal compositions and agricultural sprays such as DDT, 2,4-D, Toxaphene, Chlordane, dormant or mineral oil sprays, nicotine sulfate, Methoxychlor, etc. and are effective dispersants for pesticidal powders, such as those containing the above toxicants. They are valuable emulsifiers for herbicides, etc.

These products are also valuable for use as additives to petroleum products, such as fuel oils, lubricating oils, greases, and an additives to the water or brine used for oil recovery from oil-bearing strata by flooding techniques.

Other valuable uses are in metal cleaning compositions; dry cleaning compositions; additives for rubber latices; foam inhibitors for synthetic rubber latex emulsions; froth flotation agents; additives for road building materials; as air entraining agents for concrete or cement, additives to asphalt compositions; plasticizers and modifiers for vinyl plastics, alkyd resins, phenolformaldehyde resins and other types of polymeric-type plastic materials; for incorporation into adhesives, paints, linoleum, for use in bonding agents used in various insulating and building materials; as refining aids in wood digesters to prepare pulp; as additives to pulp slurries in beating operations to prevent foaming and also to aid the beating operation in paper-making; and as aids in the preparation of viscose dope.

The products are also useful as emulsifiers for emulsion polymerization, as mercerizing assistants, wetting agents, rewetting agents, dispersing agents, detergents, penetrating agents, softening agents, lime soaps dispersants, dishwashing agents, anti-static agents, disinfectants, insecticides, mothproofing agents, bactericides, fungicides and biocides. They are valuable as anti-fogging agents for use on glass and other surfaces where the accumulation of an aqueous fog is detrimental. They are useful in the rayon industry as additives to the dope or to the spinning bath and as aids in clarifying viscose rayon. They are of value in hydraulic fluids to improve viscosity characteristics.

The products are especially useful alone or in combination with other demulsifiers in breaking petroleum emulsions. They may be used to break emulsions of crude petroleum and salt water as obtained from oil wells, or to prevent water-in-oil emulsions resulting from acidization of oil wells by introducing the agent into the well, or to break or prevent emulsions which would result from a water flooding process for recovering oil from oil-bearing strata. They may also be used to break emulsions encountered in a petroleum refining process.

They are useful as corrosion inhibitors, as rust inhibitors, in the protection of metals especially ferrous metals, in acid pickling baths, in acid cleaning compositions, and in electroplating baths. Other valuable uses are as solvents or in solvent compositions, as cleaning agents for paint brushes, as additives for paints, lacquers, and varnishes; as lubricants, as greases and stuffing agents.

The products may be employed in the preparation of skin creams, lotions, salves and other cosmetic preparations such as home hair-wave sets, shaving creams, shampoos, toothpastes, etc. They may also be employed in food products, as foaming agents, emulsifying agents, and softening agents.

They may be used as aids in conditioning of soil; as aids in the grinding, milling or cutting of metals either in aqueous solution, emulsions or in oils; as aids in the fixing of dyes to leather and natural or synthetic fibers; as aids in level dyeing of fibers; as aids in stimulating plant growth; as an additive to cement to improve the strength of the resulting concrete or to improve its hardening time or its resistance to freezing and thawing or scaling; and as curing aids and penetrants for use in fertilizer.

Having thus described our invention, what we claim as new and desire to obtain by Letters Patent is:

1. A fluorine-containing ester of the formula

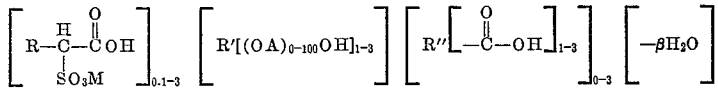

where R is an alkyl group having 6–50 carbon atoms; M is a member selected from the group consisting of hydrogen and a cation; R' is the hydrocarbon-containing moiety of an alcohol; OA is an oxyalkylene unit; R" is the hydrocarbon-containing moiety of a carboxylic acid; $\beta$ represents water removed during esterification; with the proviso that at least one member of the group consisting of R' and R" be fluorine-containing.

2. A fluorine containing ester of the formula

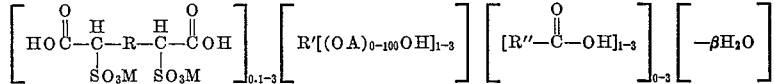

where R is an alkylene group having 1–50 carbon atoms; M is a member selected from the group consisting of hydrogen and a cation; R' is the hydrocarbon-containing moiety of an alcohol; OA is an oxyalkylene unit; R" is the hydrocarbon-containing moiety of a carboxylic acid; $\beta$ represents water removed during esterification; with the provision that at least one member of the group consisting of R' and R" be fluorine-containing.

3. A compound having the formula

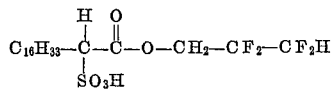

4. A compound having the formula

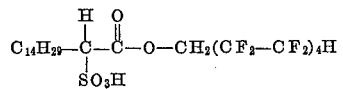

No references cited.